May 12, 1936.  E. A. HUGUENARD  2,040,693

SOUND RECORD

Filed Jan. 9, 1930  4 Sheets-Sheet 1

E. A. Huguenard
INVENTOR

By: 
Attys.

May 12, 1936.  E. A. HUGUENARD  2,040,693
SOUND RECORD
Filed Jan. 9, 1930  4 Sheets-Sheet 2

E. A. Huguenard
INVENTOR

By Marks & Clark
Attys.

May 12, 1936.  E. A. HUGUENARD  2,040,693
SOUND RECORD
Filed Jan. 9, 1930  4 Sheets-Sheet 4

E. A. Huguenard
INVENTOR

By: Marks Klar
Attys.

Patented May 12, 1936

2,040,693

UNITED STATES PATENT OFFICE 2,040,693

SOUND RECORD

Eugène Alexandre Huguenard, Paris, France, assignor to Carl W. Fenninger, Philadelphia, Pa., as trustee Application January 9, 1930, Serial No. 419,643
In France January 14, 1929

24 Claims. (Cl. 274—46)

In the recording of sound on cylinders or discs, in accordance with the classic method originally used by Edison and practiced for many years, the depth of the acoustic groove was made to vary in accordance with the sound to be reproduced. More recently, this process has been abandoned and the sounds to be recorded effect variations in the shape of the edges of the groove rather than in its depth. In connection with the more recent proposal to replace disc-shaped records by strip-shaped records, similar to cinematographic films, and thereby prolong the period of playing, undulating record grooves have been engraved upon such strip-shaped records. In connection with both types of recording, however, the recording tool used has been of the pointed type, e. g. a very fine needle.

The present invention has as its object the improvement of apparatus and processes employed in the recording and reproduction of sounds on strip-shaped records and the duplication of such records for the purpose of obtaining copies thereof. The primary feature of the invention consists in the use of recording and reproducing tools which have broad edges. Such an edge may be a cutting edge in case it is used for recording, or a smooth edge in case it is to be used for reproduction. The edge is adapted to lie in a plane which is substantially parallel to the film or record surface and in a line which is perpendicular to the direction of motion of such surface during the recording and reproduction operations; its breadth is constant throughout its operative depth and is considerably greater than that of the tools which have been commonly used heretofore. The breadth of the tool may be as great as two or three millimeters, the breadth varying in accordance with the volume of sound required.

The invention has as a further object the use of tools having a natural vibratory period of a frequency beyond the range of audibility. It may, for example, have a frequency of 20 kilocycles per second, in order to avoid any effect of the vibration of the tool on the acoustic effects obtained in the recording and reproduction of the record. Such a frequency effects damping of the undesired parasitic noise arising from the rubbing of the tool over the record. The tools are, therefore, comparatively heavy and it is for this reason that the use of stationary tools is preferred. In the utilization of such tools in the recording and reproduction of sound, the film is moved in a direction perpendicular to its recording surface, the movement of the film being regulated by the depth of the groove.

It is possible, in the practice of the invention, to increase the advantage in long duration of playing inherent in the use of a film in place of a disc or cylinder by engraving several parallel grooves upon the film or by recording on both sides of the film.

The width of the bottom of the groove allows an acoustic energy to be obtained which is considerably in excess of that which is possible in the use of the ordinary pointed needles. The reason for this fact is that, with a pointed needle, the needle bears against the groove only through a very narrow line of contact. It is therefore necessary, in connection with such grooves, to effect considerable undulations in the depth of the groove in order to obtain the desired volume. In the use of wide recording and reproducing tools for the recording and reproduction of sound by means of a wide groove, as described above, on the other hand, the contact surface between the tool and record may be much greater and increased pressures may be used so as to provide a large volume of energy for the sound reproducer without the necessity of engraving grooves of very great depth within the record.

The advantages of the use of broad tools for recording and reproducing wide sound grooves are of particular importance in connection with strip records. In the first place, the natural fragility of a celluloid strip makes it important that the engraving of the strip to a depth sufficiently great to seriously impair its strength should be avoided. In the use of a wide tool in connection with such a strip, it is possible to apply a sufficient degree of energy to produce a groove which is capable of reproduction to obtain the desired volume of sound without the necessity of engraving the record to such a depth as to create danger of breakage. Another advantage of the use of a wide and shallow groove lies in the fact that the material surrounding the small depth of the groove is much more likely to be homogeneous than in the case of a deeper groove. This fact makes it possible to effect an accurate control of the recording operation. The large breadth of the tool edge also makes it possible to utilize a tool having a size large enough to increase its natural vibratory period beyond the range of audibility.

Figure 1:
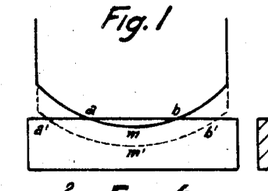
Figures 1, 2 and 3 illustrate diagrammatically the advantages of a straight edged tool.

It is also of advantage to have a rectilinear edge parallel to the film surface. The force required for projecting the tool by a predetermined amount into the film depends solely upon the increase in depth to be attained and not upon the depth of the tool in the film at the moment under consideration. The increase in depth is thus proportional to the force applied to the tool. In the use of a tool having a non-rectilinear edge, as illustrated in Figure 1, this proportionality factor does not hold. It will be quite evident from an inspection of Figure 1 that the increased depth of penetration of the curvilinear tool of that figure, upon the application of a given force thereto, is dependent upon the depth of penetration of the tool just prior to the application of such force. Thus, if the tool penetrates the strip only through the arc $a\ m\ b$ at the moment of the application of the given force thereto, it will be seen that the increase in penetration will be much greater than if such a force is applied to the tool after it has penetrated the strip through the arc $a'\ m'\ b'$. It will thus be seen that the undulations produced by a given impulse are strictly proportional to that impulse in the case of a rectilinear tool, such as that of the present invention, whereas the degree of such undulation does not bear such a strict proportion in the case of a curvilinear tool, but varies in accordance with the degree of penetration of the tool at the moment that the impulse is received.

Figure 2:
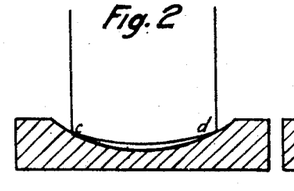
Figure 3:
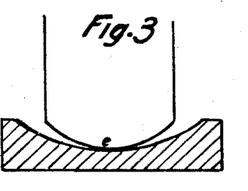

Another important factor of advantage in connection with the use of a broad straight-edged tool lies in the fact that it is much easier to accurately produce such a tool than to produce broad tools having curved edges. In the use of curvilinear reproducing tools, the radius of curvature of the tool must conform exactly to the transverse radius of curvature of the sound record. If the radius of curvature of the tool is too large, as illustrated in Figure 2, the tool will bear against the bottom of the groove only adjacent its opposite longitudinal extremities $c$, $d$. If, on the other hand, the curvature of the tool is too small, it will bear against the bottom of the groove only adjacent its central portion. In either case, only a limited zone of contact between the tool and strip will be attained.

Other objects and advantages of the invention will be disclosed hereinafter in the following description of several forms of execution thereof. On the appended drawings:

Figures 4, 5, 6, 9, 10, 11:
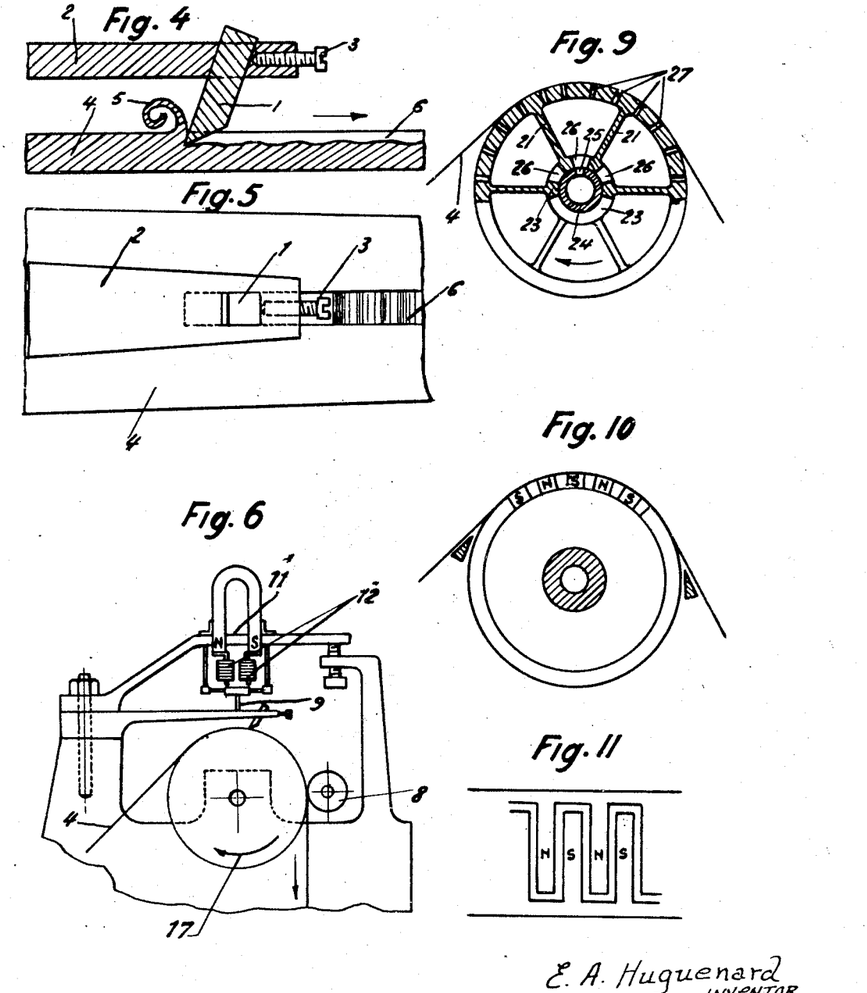
Figure 4 is a central longitudinal section of a recording tool and film.
Figure 5 is a plan view corresponding to Figure 4.
Figure 6 is a side elevation illustrating the recording of sound in accordance with the principles of the invention by means of a moving tool.
Fig. 9 is a sectional view illustrating the utilization of a driving drum for pneumatically feeding the strip.
Figure 10 is a sectional view illustrating a magnetic drive.
Figure 11 is a development of the drum of Figure 10.

Referring to the drawings by reference characters, the principal feature of the invention can be best understood by reference to Figures 4 and 5. As illustrated in these figures, the straight-edged tool 1, which resembles a carpenter's chisel, is held in a tool holder 2 by means of a screw 3. The film 4 is adapted to move from left to right against the cutting edge of the tool 1 in order that the tool may remove a shaving 5 from the strip. It is obvious that if the tool moves vertically, the thickness of the shaving will vary and that the tool will produce in the film a groove 6 of constant width and of varying depth.

In the form of the invention illustrated in Figure 6, the recording tool is actuated by electro-magnetic means. The film 4 is drawn over a drum 7 against which it is pressed by means of a roller 8. The tool holder 2 is connected by means of rod 9 with an electro-magnetic device 11. The varying intensity of the current produced by a microphone, amplified if required, is passed through the coils 12, thereby causing vibrations of the tool holder and corresponding variations in the depth of the acoustic groove produced in the film 4.

In the practice of the invention it is important that the recording tool be arranged at a proper angle with respect to the film. If the tool were arranged perpendicular to the film, it would require a large force to effect the desired penetration. On the other hand, if the tool were inclined at too great an angle, it would penetrate the film to so great a depth as to effect an undesired undulation thereof. In operation, it is therefore important to choose an angle slightly greater than that at which it would engage the film without the exertion of any special effort upon the tool. By this arrangement, a very slight effort is sufficient to make the tool engage the film material. This cutting angle depends, of course, upon the nature of the material and must be adjusted differently in case the film is of metal, than in the case of celluloid.

Figure 7:
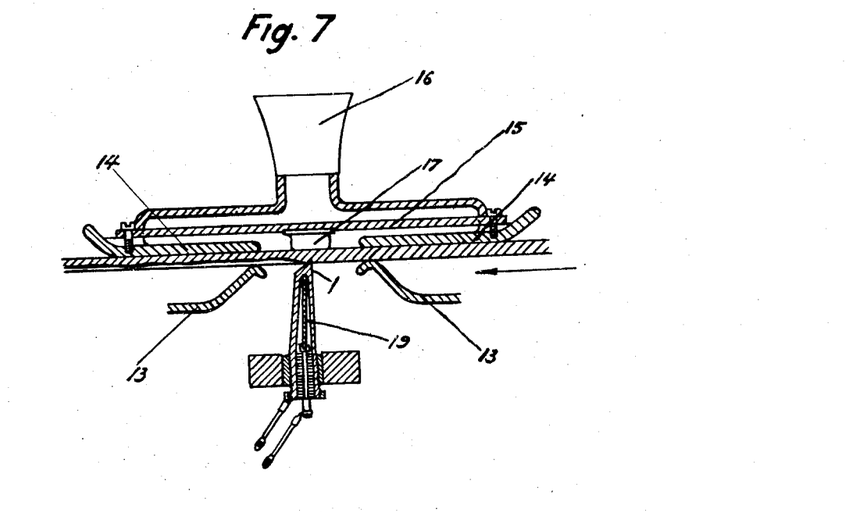
Figure 7 is a central longitudinal section illustrating the utilization of a heated tool in the practice of the invention.
Figure 8:
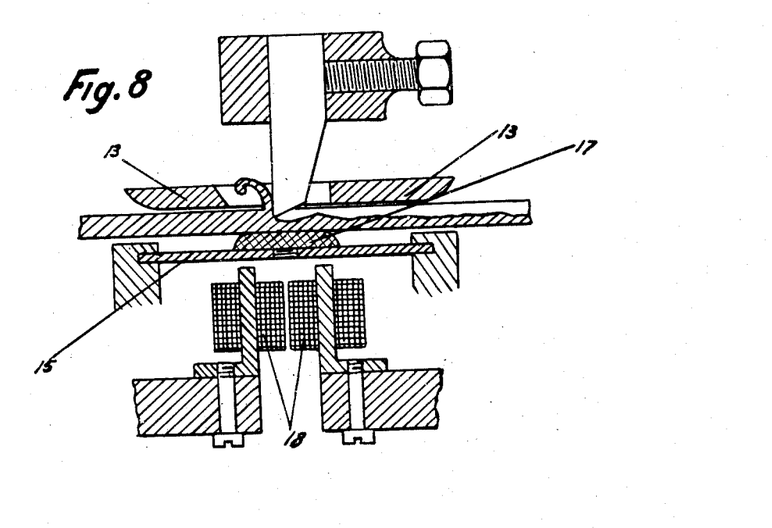
Figure 8 is a similar sectional view, illustrating a modification of the invention by which the film is given the vibratory movements necessary for recording by electrical means.

The modifications of Figures 7 and 8 illustrate the use of a stationary tool in the practice of the invention. In the use of such a tool, the strip upon which the record is made is caused to vibrate in a direction perpendicular to its line of movement past the tool, in order that the undulating sound groove may be produced. Such an arrangement possesses especially important advantages over the arrangement of Figure 6 in connection with a relatively heavy tool, such as that used in the preferred embodiment of the invention, for a large amount of energy must necessarily be consumed in overcoming the inertia of such a heavy tool, if the tool and tool holder are moved in the recording of the sound.

In the form of the invention illustrated in Figures 7 and 8, it is only necessary to effect the desired vibratory movement in the flexible strip itself, and by effecting such vibration in the recording of the sound, a large amount of energy is thus saved.

In the modification of Figure 7, the film 4 slides between the guides 13 and the bottom of a dished plate 14 having upturned edges containing a membrane 15, which is similar to the usual phonograph diaphragm. The acoustic vibrations of the air are caused to impinge upon this membrane by a horn 16 which receives the sounds to be recorded. A button 17 secured to the diaphragm holds the film against the stationary tool. The film moves from right to left, as illustrated in this figure, and the vibrations of the diaphragm cause the film to bear with more or less force against the edge of the tool 1, thereby causing the tool to penetrate the film with varying depth and produce a groove 6 of constant width containing undulations corresponding to the sounds by means of which they were produced. The tool may be made hollow in shape and heated by means of an inner resistance element 19. The heating of the tool softens the material of the record and allows easy penetration of the tool to effect the recording operation.

In the use of the broad tool illustrated in Fig. 7, current flows through the resistance element to the main body of the tool and returns through the main body of the tool. In view of the resistance to the movement of the film imposed by the broad recording tool, it is necessary to drive the film by means affording a considerable tractive action. In view of this fact, and in order to give the film a uniform tractive force, the adherence between the film and the driving drum may be increased by means of the arrangements shown in Figures 9 to 11.

In the arrangement of Figure 9, the drum over which the film is fed is provided with a plurality of arcuate compartments bounded by the radially extending webs 21 and end plates at its opposite axial extremities. The hub 23 of this drum is hollow and is provided with slots 26 which are adapted to communicate with the interior of a hollow stationary axle 24 through an opening 25 in this axle. The periphery of the drum is provided with openings 27 which thus communicate with the interior of the axle 24 when the slot 25 is in registry with the slot 26 of the particular arcuate compartment with which the particular slots 27 in question communicate. The interior of the axle 24 communicates with a suction pump or other means for evacuating air from the interior thereof. It will thus be seen that in the rotation of the hub 23 about the axle 24 the arcuate compartments bounded by the webs 21 come successively into communication with the evacuated space within the hollow axle and thus draw the film firmly against successive series of openings 27 in the drum as it is fed longitudinally through the apparatus.

In case a film of iron or steel is used, it is possible to make use of magnetic attraction in effecting a feed of the film. Such an arrangement is shown in Figures 10 and 11. In the modifications of these figures, the end walls of the cylindrical drum are made of iron or steel surfaces polarized by means of permanent magnets, not shown, or of an electro-magnet disposed inside the drum along its axis. These end walls are provided with extensions constituting alternating pole members N. S., as illustrated in Figures 10 and 11. It will be obvious that the lines of force of the magnetic field will close between the pole members N. S. through the metallic film, thereby attracting this film to the drum with a considerable degree of force and thus insuring a uniform drive of the film by the drum.

In the above discussion of the invention, it has been assumed that the film was made of a homogeneous material from which a shaving of varying thickness was removed by the recording tool. It is, however, within the scope of my invention to utilize a blunt-edged heated tool which effects a greater or lesser degree of compression of the film material in accordance with impulses received by the heated tool. Such a tool may be used in connection with a homogenous film or with a coated film. It is also within the scope of the invention to utilize a supporting strip provided with a coating and to effect variations in the depth of said coating either mechanically, electrically or chemically. Thus, the film may be coated with a comparatively opaque coating in which the tool produces a groove of varying thickness. This film may be reproduced by the action of a photo-electric cell, the intensity of the light beam passing through the groove varying with the thickness of the comparatively opaque coating removed by the tool. In accordance with another embodiment of the invention, the coating may be formed by means of a layer of bromide gelatine, which when developed is more or less dark according to the degree to which it has been acted upon by the tool. The film produced by means of such a coating may be reproduced by a photoelectric cell, in the manner described above.

The use of a film provided with a coating of an opaque varnish is also within the purview of my invention. The film may be provided with such a varnish which becomes transparent when heated, or on the other hand, it may be provided with a transparent varnish which becomes opaque when heated; in either case the recording tool, whether hot or cold, modifies the transparency of the zone swept by it and thus enables the sounds recorded to be faithfully reproduced. The coating may also be modified by means of an electric current passing through the tool.

The use of a metallic film coated with a layer of softer material, such as celluloid, also falls within the scope of the invention. In case of the use of such a film, the tool produces its groove in the softer material.

Many of the principles described above may also be used in the reproduction and duplication of films. The films thus duplicated are usually not made directly from the acoustic energy itself, but by means of an impressed film or disc-shaped record. This record is caused to act on a pick-up and the currents thus produced are amplified and sent into an apparatus, such as the one shown in Figure 6 or 8. A series of disc records may be reproduced upon a single long playing film so as to allow the uninterrupted playing of a composition which would have required several disc faces in its recording.

In case of the duplication of a film by engraving the sound record of the film upon the second film, the speed of movement of the second film during the reproducing operation may be adjusted independently of that of the film or disc controlling the pick-up. By such an arrangement, acoustic inscriptions may be produced having a greater slope than those obtained on the record which is being copied. For instance, if the original acoustic groove has been obtained with too slow a motion, the slopes may be too sharp. This draw-back can be removed by making the copy film move at a greater speed than the original record, thereby decreasing the slope of the bottom of the groove. By the use of a proper control, a film to be duplicated may be kept in synchronism with a picture film upon which it is to be copied and the copy will be accurate in spite of the modification of the speed of the original film required by the simultaneous use of a picture film.

It is also possible to correct defects during the process of making a copy from a record strip by controlling the electric current between the pick-up and the copying device. Thus, the amplifier may be controlled to increase or decrease the volume of sound in certain passages so that the copy will not have any too loud or too low passages.

In making a copy a sound filter may also be used for damping any vibrations tending to cause a harsh sound or any other undesired sound. It is also possible, in the practice of the invention, in making copies of recorded compositions to superimpose upon the copy during the reproduction from the original record an additional record. Thus, if a sound has been recorded with little or no accompaniment, a suitable accompaniment may be superimposed upon the copy by providing musical instruments playing in front of a microphone which is connected with the tool adapted to make the copy.

Figures 12, 13, 14:
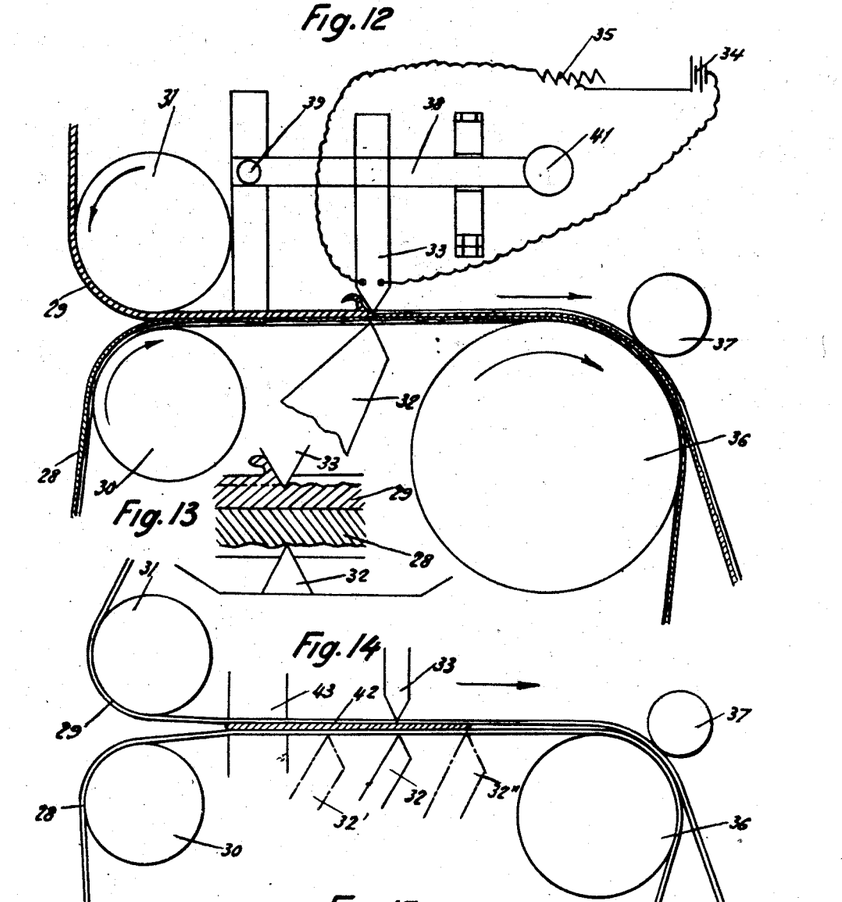
Figure 12 is a diagrammatic illustration of a machine for reproducing or copying the film.
Figure 13 is an illustration on an enlarged scale of the operation of the tools of Figure 12.
Figure 14 is a view similar to Figure 12, illustrating a modification of the structure of that figure.

The methods described above for copying a sound record are necessarily relatively expensive. A more economical method of obtaining the same result is illustrated in Figure 12. In copying a film by the method illustrated in that figure, the engraved original film 28 and the non-engraved copy film are superimposed with the non-recording sides together and passed between rollers 30 and 31. The films then pass between a stationary stop 32 having a blunt edge and a stationary engraving tool 33 of the type above described. The tool 33 may be heated, if desired, by means of current from a battery 34, the amount of current being adjusted by a rheostat 35. The superimposed films are driven by means of the drum 36 against which they are held by the roller 37. The recording tool 33 is carried by a lever 38 which is pivotally secured at 39 to the frame of a machine. A weight 41 is secured at the other end of the lever 38 from its pivot and this weight urges the edge of the tool 33 against the film on which the copy is to be made.

The operation of this embodiment of the invention is as follows. The film 29 is caused to move in a direction at right angles to the edge of the tool 33 by the action of the tool 32 in following the groove of the strip 28. This action causes the cutting edge of the tool 33 to project a greater or less degree within the surface of the strip 29 and thus cut a groove of varying depth in that strip which is exactly complemental to the groove in the strip 28. The troughs of the groove in the strip 29 will thus correspond exactly to the projections in the bottom of the groove of the strip 28 and vice versa, as illustrated in Figure 13. The copy strip thus contains a sound groove which shows in intaglio exactly what the original record shows in relief. When played, the copy film will cause vibrations which produce exactly the same sounds produced by the reproduction of the original. In the production of copies in accordance with the method described above, the width of the groove in the copy film may vary from the width of the groove in the original film, thereby producing a volume of sound in the copy film which may vary at will from that produced in the original.

In the modification of Figures 12 and 13 described above, the groove produced in the copy film 29 will not conform exactly with that in the original film 28, as the lever 38 carrying the tool 33 is not rigidly mounted. If an exact copy is desired, the tool 33 should be rigidly mounted. The arrangement of Figure 12 increases the relative magnitude of the undulations caused by the sharper sounds. The reverse result would be obtained by mounting the tool 33 in a stationary manner and by yieldably mounting the tracing tool 32.

Figure 14 illustrates a modification in which films 28 and 29 pass upon opposite sides of a light yielding blade 42 which may be secured to the frame 43 of the machine. The flexibility of this blade allows it to move vertically under the action of the passage of the film 28 over the tool 32. In this arrangement the speed of the two films does not need to be equal; film 29 may, therefore, be progressed at a speed different from that of the film 28 and a longer record may be produced upon the film 29 than on the film 28, thereby enabling this film to be reproduced at a speed different from that at which the original film 28 has been recorded. In this arrangement the amplitude of the undulations in the sound path may be varied by locating the tool 32 rearwardly of the tool 33, as indicated at 32', or forwardly thereof as indicated at 32₂.

Figure 15:
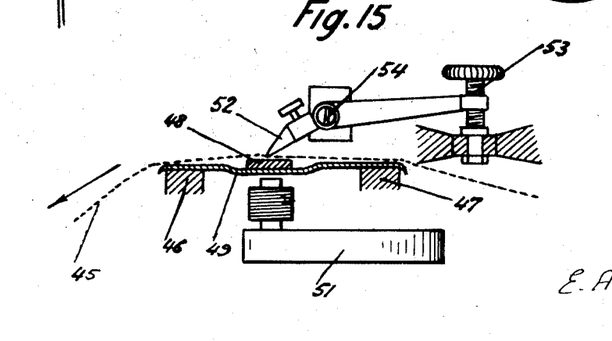
Figure 15 is a diagrammatic cross-section, illustrating an electric reproducing machine.

One form of reproduction is illustrated in Figure 15. This figure illustrates diagrammatically a device in which the general motion of the film actuates the diaphragm of a magnetic transmitter. The current issuing from this transmitter is amplified and caused to act upon a receiver, such as a loud speaker, in the reproduction of the recorded sound. In this modification the film 45 passes over two stationary stops 46 and 47 which are interconnected by a metal diaphragm 49 adapted to vibrate in front of the poles of the electro-magnet 51 which forms with the diaphragm 49 a magnetic transmitter. A blunt-edge reproducing tool 52 overlies the film 45 in its movement across the diaphragm, this tool contacting the bottom of the groove to effect vibration of the diaphragm 49 and reproduce the recorded sound, in accordance with the vertical movements imparted to the diaphragm by the stationary tool engaging its undulating groove. The movements of the diaphragm induce currents in the coils of the electro-magnet 51 and these currents may, after amplification, be used for actuating telephone receivers of any type, such as loud speakers.

Figure 16:
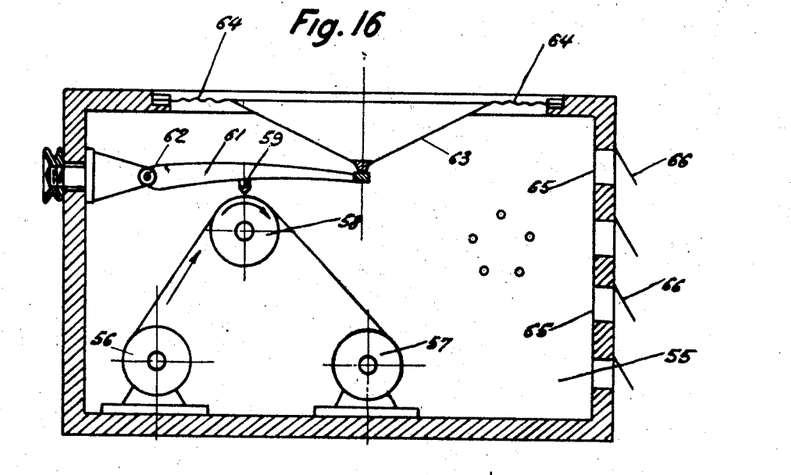
Figures 16 and 17 show two forms of mechanical playing machines adapted to be used in the reproduction of sound records produced in accordance with the invention.

Figure 16 indicates a simplier arrangement of reproducing mechanism in which the sound is directly mechanically reproduced from the strip without the use of an electro-magnetic arrangement such as that illustrated in Figure 15. In the modification of this figure a resonance box 55 containing two reels 56 and 57, is provided. A motor, not shown, drives the reel 57 so as to draw the film from the reel 56 to reel 57 across roller 58. A blunt-edged tool 59 bears against the bottom of the film groove and is caused to undergo vertical vibration during the unwinding action by reason of the varying depth of the groove. This tool is pivoted at 62 and its free end carries the apex of a loud speaker cone 63. The cone is connected by means of a circular yielding rim 64 to the edge of an opening provided in the box 55 and vibrations imparted to this cone through the reproducing tool 59 and arm 61 effect reproduction of the recorded sound. In this embodiment, the box 55 should be sufficiently large to cause the natural period of the air contained therein to be small enough to allow reproduction of the lower notes. The box may be provided with apertures 65 which are adapted to be closed to a greater or less degree by shutters 66 to vary the volume of the sound.

Figure 17:
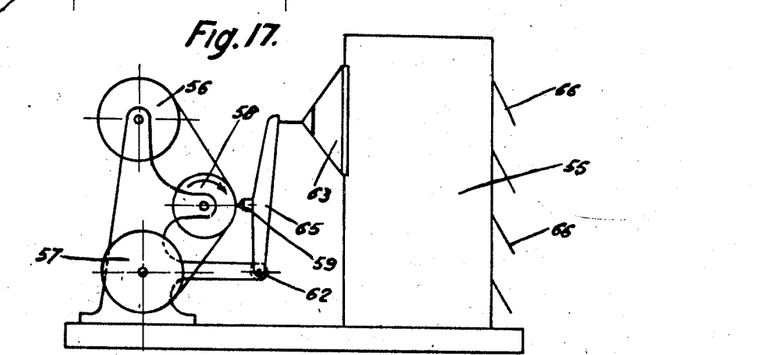

Figure 17 shows an arrangement which is generally similar to that of Figure 16. In this embodiment, however, the reproducing tool and reels over which it is found are located outside of the resonance box.

Figure 18:
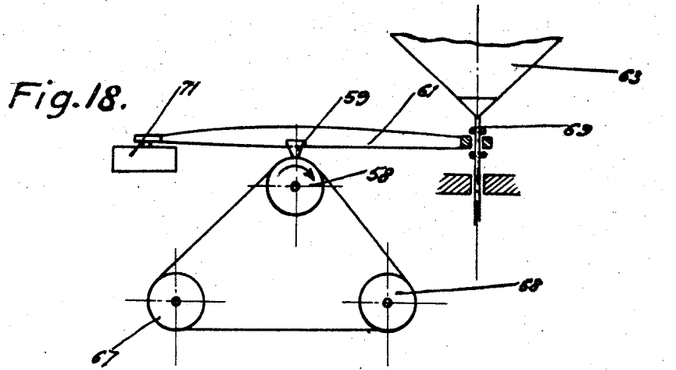
Figure 18 is a modification of the machine shown in Figure 16, illustrating the application of the invention to the playing of endless films having oblique grooves.

Various other modifications are possible in connection with the reproduction of the recorded sound. An endless film provided with a plurality of parallel grooves may, for example, be used. If such a film is used, the grooves are run in a direction which is slightly oblique with reference to the film axis, in order that successive grooves may be interconnected to produce, in effect, a single groove having a length many times the length of the endless band. The sound record of such a film may be reproduced by the apparatus of Figure 18. In this apparatus the film passes over three rollers 58, 67 and 68 driven by a motor, not shown. The reproducing tool 59 is carried by a lever 61 which may be mounted for movement in a horizontal plane around an axis 69 secured to the apex of the reproducing cone 63. The other end of the lever 61 carries a comparatively heavy weight 71 in order to retain it in contact with the groove of the film. It is apparent that the tool 59 can move perpendicularly into the film in order to produce the desired sound effect and that it may move laterally thereof to follow the oblique sound groove. In connection with such an arrangement, the weight 71 should be comparatively heavy in order that vibrations due to the natural vibratory period of the lever may have no effect upon the reproduced sound transmitted to the cone 63. By turning the ends of a strip of the character described above, prior to the operation of interconnecting these ends, it is possible to utilize both sides of a strip in the recording and reproduction of sounds in accordance with the invention.

In the practice of the invention it is naturally important to use perfectly smooth recording and reproducing tools. In order to obtain such smooth tools it is proposed to cover them with a varnish or with an enamel coating, either by means of melting such coating and subsequently solidifying it upon the tool, or by means of applying a solution of such coating in a volatile medium to the tool. In the use of such a coating material in connection with a tool designed to be heated, it is important to choose a coating medium having a coefficient of expansion substantially the same as that of the tool to be coated. For instance, the tool may be made of a hard alloy of platinum and another metal and the coating material may be formed of an enamel of silicon to which is added a small proportion of a suitable base in order to give to the enamel the required fusibility and a coefficient of expansion approximately the same as that of the platinum alloy. Such an enamel is infusible at the working temperature of the tool and will protect it against the action of the air which might otherwise corrode it when hot.

Still other modifications will be obvious to those skilled in the art and I do not therefore wish to be limited except as defined in the terms of the sub-joined claims.

What I claim is:

1. A method for duplicating a sound groove in a strip record consisting in placing the master and an ungrooved blank strip record back to back and while in that position drawing them longitudinally over an unyielding stop contacting with the undulating surface of the sound groove and thereby so vibrating the blank strip record that a stationary cutting tool engaging therewith forms a corresponding inverse undulating surface in the blank strip record.

2. A method of duplicating a sound groove in a strip record consisting in placing the master and a blank strip back to back with their record faces outwards and drawing them past two opposed members, one of which contacts with the undulating surface of the sound groove in the master record thereby so vibrating the blank record that the other member forms thereon an inverse undulating surface.

3. A method for duplicating a sound groove in a strip record consisting in placing the master and an ungrooved blank strip record back to back and while in that position drawing them longitudinally over an unyielding stop contacting with the undulating surface of the sound groove and thereby so vibrating the blank strip record that a stationary cutting tool engaging therewith forms a corresponding inverse undulating surface in the blank strip record, and varying the relative longitudinal speed of movement of the strips to control the steepness of the undulations formed on the blank strip.

4. In an apparatus for duplicating a sound groove in a record, opposed means between which a vertically undulating record and a blank record are passed with their faces outward, one of said means contacting with the undulatory bottom of the sound groove in the master record to cause the other of said means to form a sound groove in the blank record which will be inversely undulatory with respect to the master record.

5. In apparatus for duplicating a sound groove in a record, a master record having a groove including a surface undulating in accordance with the recorded sound, a blank record placed back to back with the master record, opposed members between which the two records are passed, one of said members contacting with the undulating surface of the master record, the other of said members engaging the face of the blank record, a fixed support for one of said members and a yielding support for the other of said members.

6. In apparatus for duplicating a sound groove in a record, a master record having a groove including a surface undulating in accordance with the recorded sound, a blank record placed back to back with the master record, opposed members between which the two records are passed, one of said members contacting with the undulating surface of the master record, the other of said members engaging the face of the blank record, a fixed support for one of said members and an inertia controlled yielding support for the other of said members.

7. In apparatus for duplicating a sound groove in a record, a master record having a groove including a surface undulating in accordance with the recorded sound, a blank record, a yieldingly supported plate, the opposite surfaces of which are respectively engaged by the backs of said records, opposed members between which said plate is supported, means for moving said records over said plate and between said opposed members, one of said members contacting with the undulatory surface of the master record, and the other of said members engaging the face of the blank record.

8. In apparatus for duplicating a sound groove in a record, a master record having a groove including a surface undulating in accordance with the recorded sound, a blank record, a yieldingly supported plate, the opposite surfaces of which are respectively engaged by the backs of said records, opposed members between which said plate is supported, means for moving said records over said plate and between said opposed members, one of said members contacting with the undulatory surface of the master record, and the other of said members engaging the face of the blank record and means for adjusting one of said members to different positions relatively to the other of said members in the plane of the record engaged thereby.

9. In a phonograph, the combination comprising a thin and flexible strip having a vertically undulating wide sound band of rectangular cross section in a flat face thereof, a reproducing tool having a broad-faced rectilinear edge substantially as long as the width of the sound band, means for urging the rectilinear edge of the reproducing tool into engagement with the record in a position affording a transverse line of contact between the rectilinear edge of the tool and the sound band substantially as long as the width of sound band and means for effecting longitudinal movement of the strip with respect to the tool while the parts are held in such contact.

10. The method of reproducing sound recorded upon the flat face of a thin and flexible flat strip record in a wide sound band of undulating depth, which comprises effecting longitudinal movement of said strip record with respect to reproducing apparatus and, during such movement, maintaining a broad faced rectilinear edged reproducing tool forming a part of said sound reproducing apparatus in contact with said sound band over a line substantial the width of the sound band.

11. The method of making a sound record for optical reproduction which comprises mechanically altering the light transmitting capacity of a moving medium by removing a portion thereof to a degree which varies in accordance with the sound to be recorded to thereby form a sound track which is capable of controlling and varying the amount of light passing through it in accordance with the recorded sound.

12. The method of making a sound record which comprises mechanically altering the light controlling capacity of a moving medium by removing a portion thereof to a degree which varies in accordance with the sound waves to be recorded.

13. The method of making a sound record capable of optical reproduction which comprises removing a light obstructing coating from a transparent base to form a sound track, the amount of coating removed being varied in accordance with the sound to be recorded.

14. The method of making a sound record capable of optical reproduction which comprises removing a translucent coating from a transparent base to form a sound track, the amount of coating removed being varied in accordance with the sound to be recorded.

15. A sound record comprising a transparent base having a translucent coating and a sound track on said record of the variable density type, said sound track being formed by a variation in the depth of the translucent coating in the track, which variation is in accordance with the recorded sound.

16. A sound record comprising a flexible strip of transparent material constituting a transparent base, a translucent coating on said base, and a sound track on said strip of the variable density type, said sound track being formed by a variation in the depth of the translucent coating at the track, which variation is in accordance with the recorded sound.

17. A sound record blank adapted to receive a sound track capable of optical reproduction comprising a transparent base having a coating of light obstructing material, said coating having a degree of softness such that it may be cut by a recording stylus, and a thickness sufficient to receive an undulating sound track.

18. A sound record blank adapted to receive a sound track capable of optical reproduction, said blank having the form of a flexible strip and comprising a transparent base, having a coating of translucent material of a thickness sufficient to receive an undulating sound track.

19. A sound record blank adapted to receive a sound track capable of optical reproduction comprising a flexible strip of material, the base portion of which is transparent and the surface portion of which is translucent.

20. A sound record blank adapted to receive a sound track capable of optical reproduction comprising a flexible strip of homogeneous material, the translucency of which varies in accordance with its thickness.

21. A method of forming a sound record on a strip which comprises forming a light obstructing coating on the strip, maintaining a broad-faced rectilinear edged tool in contact with said strip over a line of substantial width of the strip, relatively moving the strip and said tool in the direction of the length of the strip, relatively vibrating the strip and tool in accordance with the sound waves to be recorded in a direction normal to the strip to vary the light transmitting capacity of that part of the strip engaged by the tool in accordance with said sound waves.

22. The method of forming a sound record on a medium of which the light transmitting capacity varies with its thickness which comprises maintaining a broad-faced rectilinear edged tool in contact with said strip over a line of substantial width of the strip, relatively moving the strip and said tool in the direction of the length of the strip, relatively vibrating the strip and tool in accordance with the sound waves to be recorded in a direction normal to the strip to vary the light transmitting capacity of that portion of the strip engaged by the tool in accordance with said sound waves.

23. The method of forming a sound record on a medium of which the light transmitting capacity varies with its thickness, which comprises removing a portion of its thickness to form thereon an undulating sound track by maintaining a broad-faced rectilinear edged tool in contact with said strip over a line of substantial width of the strip, relatively moving the strip and said tool in the direction of the length of the strip, relatively vibrating the strip and tool in accordance with the sound waves to be recorded in a direction normal to the strip to vary the light transmitting capacity of that part of the strip engaged by the tool in accordance with said sound waves.

24. The method of forming a sound record on a strip which comprises forming a light obstructing coating on the strip, removing a portion of said coating to form an undulating sound track by maintaining a broad-faced rectilinear edged tool in contact with said strip over a line of substantial width of the strip, relatively moving the strip and said tool in the direction of the length of the strip, relatively vibrating the strip and tool in accordance with the sound waves to be recorded in a direction normal to the strip to vary the light transmitting capacity of that part of the strip engaged by the tool in accordance with said sound waves.

EUGÈNE ALEXANDRE HUGUENARD.